(12) United States Patent
Gurary et al.

(10) Patent No.: US 6,349,270 B1
(45) Date of Patent: Feb. 19, 2002

(54) METHOD AND APPARATUS FOR MEASURING THE TEMPERATURE OF OBJECTS ON A FAST MOVING HOLDER

(75) Inventors: Alexander Gurary, Bridgewater; Vadim Boguslavskiy, Princeton; Ameesh N. Patel, Roseland; Jeffrey C. Ramer, Flemington, all of NJ (US)

(73) Assignee: Emcore Corporation, Somerset, NJ (US)

( * ) Notice: Subject to any disclaimer, the term of this patent is extended or adjusted under 35 U.S.C. 154(b) by 0 days.

(21) Appl. No.: 09/321,356

(22) Filed: May 27, 1999

(51) Int. Cl.[7] .................. G01K 11/30; G06F 15/00
(52) U.S. Cl. .................. 702/134; 702/99; 374/126
(58) Field of Search .................. 702/85, 99, 127, 702/130, 132, 134–136, 182, 108, 124, 126, 183–185, 188, 189; 374/9, 18, 19, 120, 121, 126, 134; 250/341.4, 341.8; 700/299; 356/43

(56) References Cited

U.S. PATENT DOCUMENTS

| | | | | |
|---|---|---|---|---|
| 4,408,878 A | * | 10/1983 | Fischbach | 356/43 |
| 4,411,534 A | | 10/1983 | Kriegner et al. | 374/141 |
| 4,566,809 A | | 1/1986 | Arnaud | 374/126 |
| 4,632,908 A | | 12/1986 | Schultz | 436/157 |
| 4,693,615 A | | 9/1987 | Kyriakis | 374/129 |
| 4,859,420 A | | 8/1989 | Schultz | 422/58 |
| 4,890,933 A | * | 1/1990 | Amith et al. | 374/121 |
| 4,919,542 A | * | 4/1990 | Nulman et al. | 374/9 |
| 4,956,538 A | | 9/1990 | Moslehi | 219/121.6 |
| 4,979,134 A | | 12/1990 | Arima et al. | 702/135 |
| 5,098,198 A | | 3/1992 | Nulman et al. | 374/121 |
| 5,114,242 A | | 5/1992 | Gat et al. | 374/128 |
| 5,156,461 A | | 10/1992 | Moslehi et al. | 374/121 |
| 5,255,286 A | | 10/1993 | Moslehi et al. | 374/121 |
| 5,265,036 A | * | 11/1993 | Suarez-Gonzalez et al. | 702/134 |
| 5,294,200 A | | 3/1994 | Rall | 374/120 |
| 5,308,161 A | | 5/1994 | Stein | 374/5 |
| 5,601,366 A | | 2/1997 | Paranjpe | 374/126 |
| 5,738,440 A | | 4/1998 | O'Neill et al. | 374/9 |
| 6,179,466 B1 | * | 1/2001 | Peuse et al. | 374/128 |

OTHER PUBLICATIONS

Ramer, J. C et al. Substrate temperature measurement and control by emissivity compensated pyrometry during metalorganic vapor phase epitaxy of III–V device structures in large scale rotating disc reactors, Jul. 24–28, 2000. (continued below).*

Electronic–Enhanced Optics, Optical Sensing in Semiconductor Manufacturing, Electro–Optics in Space, Broadband Optical Networks, 2000. Digest of the LEOS Summer Topical Meetings On page(s): II49–1150.*

* cited by examiner

Primary Examiner—Patrick Assouad
Assistant Examiner—Manuel L. Barbee
(74) Attorney, Agent, or Firm—Lerner, David, Littenberg, Kromholz & Mentlik, LLP

(57) ABSTRACT

Apparatus and method for determining a real time, non-contact temperature measurement of semiconductor wafers is provided in a computer-based data gathering system. The apparatus includes a moving carrier containing semiconductor wafers and a pyrometer and a reflectometer positioned above the spinning wafer carrier for providing temperature and reflectivity data samples taken from the semiconductor wafers and spinning carrier. The data are then provided to an attached computer. The attached computer receives the reflectivity and temperature data pairs, stores them in a data table and records the frequency of occurrence of each of the reflectivity values in the series of reflectivity and temperature data. Software operating on the computer has instructions for identifying at least one reflectivity data peak representative of the reflectivity characteristics of the semiconductor wafers and instructions for determining the temperature of the semiconductor wafers based upon the frequency of occurrence of the reflectivity data and the associated reflectivity-temperature data.

51 Claims, 5 Drawing Sheets

WAFER

METHOD AND APPARATUS FOR MEASURING THE TEMPERATURE OF OBJECTS ON A FAST MOVING HOLDER

FIELD OF THE INVENTION

The present invention relates to a method and apparatus for non-contact temperature measurement of a moving semiconductor wafer employing both a pyrometer and a reflectometer to provide temperature and reflectivity data respectively to a general purpose computer.

BACKGROUND OF THE INVENTION

During the fabrication of semiconductor wafers, numerous physical parameters, such as temperature, pressure and flow rate are monitored and regulated to achieve a desired crystal growth. Maintenance of a specific temperature during the wafer fabrication process is particularly important in order to achieve a high quality semiconductor crystal. The semiconductor wafers to be grown are often placed on rapidly rotating carousels, or carriers, so as to provide a uniform surface easily accessible to circulating semiconductor gasses within a reactor chamber for the deposition of the semiconductor materials. Therefore, measurement of the wafer temperature during the deposition process is problematic in that a non-contact method of measurement is required which can accurately measure the temperature of the semiconductor wafers rotating at high speeds; often greater than 1,000 RPMs.

Non-contact temperature measurement of objects is presently possible using devices which measure the radiation reflected from a target object. These devices, known as pyrometers, are used to calculate the temperature of a physical body based on emitted radiation power from the body and a physical characteristic of the body known as its emissivity. A body's emissivity is a measure of the ratio of the emitted radiation from a body to the incident radiation. The body's temperature can be computed given its emissivity (E) and emitted radiation power (P) according to $$P = E_w 2\pi C_1 \int_0^\infty \frac{1}{(\lambda T)^5 (e^{C_2/\lambda T} - 1)} d\lambda \qquad (1)$$

Planck's equation:
Where
$E_w$=body emissivity (dependent on body color and surface characteristics)
$C_1$, $C_2$=traceable universal consants (Planck's Spectral Energy Distribution)
$\lambda$=radiation wavelength
T=body temperature From the emitted radiation power (P), the corresponding temperature of the body (T) may be accurately determined using the above equation if the emissivity of the body is known.

Often, however, the emissivity of the semiconductor wafers whose temperature is to be determined changes during the course of the semiconductor growth process so as to complicate its temperature determination. Therefore, a real-time determination of the semiconductor wafer emissivity is necessary, in order to properly calculate the temperature of the semiconductor wafers during all phases of the semiconductor growth process.

Further complicating determination of the semiconductor wafer temperature is the fact that the semiconductor wafers are often placed upon a carousel within a chemical vapor deposition (CVD) chamber. The CVD chamber is a sealed environment that allows infused gases to be deposited upon the wafers to grow the semiconductor layers. Rotation of the semiconductor wafers upon the carousel permits an even deposition of infused gases upon the wafers. The rapidly rotating carousel presents difficulties in accurately measuring the semiconductor wafer temperature by the pyrometer, however, in that the pyrometer is typically fixed over a single point along the radius of the carousel such that sequential temperature measurements may include readings from the semiconductor wafers, the carousel itself, or the boundary between the semiconductor wafers and the carousel.

Several possible approaches may be used to make wafer temperature measurements using a high-speed pyrometer positioned over a rapidly rotating wafer carrier. First, a sequence of temperature measurements using a real-time algorithm to separate wafer and carousel temperatures may be used. The problem with this approach is that modem pyrometers can provide high-speed measurements with single point data acquisition times in the range of 0.1 milliseconds, but they often require a much longer time, e.g., on the order of 20 milliseconds or more, between single measurements to perform calculations and self-calibration. As a result, sequential temperature measurements of the wafer carrier and wafer are not easily obtained so as to obtain reliable temperature measurements from the wafer only.

A second approach employs a triggering function in which the pyrometer measurements are taken at a frequency close to the period of rotation for the wafer carrier. With this approach, the pyrometer provides data measurements scanned across the disk, i.e. a stroboscopic effect, to generate temperature data. The "down time" between temperature measurements is used to achieve the above-mentioned calculations and self-calibration. However, this method also has its shortcomings. In particular, modern pyrometers often initiate an autonomous self-calibration with respect to the ongoing measurements of temperatures. Such autonomous self-calibration necessarily interferes with any periodic gathering of temperature data from the pyrometer and makes such temperature determinations on a periodic basis extremely difficult.

To overcome the difficulties of the above solutions, an encoder may be installed on the carousel spindle to provide a "trigger" for the initiation of pyrometer measurements. This approach, however, requires additional system complexity related to the synchronization between the encoder and the wafer locations. Further, the delay in communications between the encoder and the pyrometer requires complex calibration procedures for each different rotation speed of the carousel and, therefore, requires recalibration when changing speeds.

In sum, the present level of pyrometer development does not allow for the implementation of a simple and reliable method of measuring the temperature of semiconductor wafers on a rapidly rotating carousel, particularly where the emissivity of the semiconductor wafer is varying over the measurement time.

SUMMARY OF THE INVENTION

In accordance with the present invention an apparatus has been provided for determining the real-time, non-contact temperature measurement of first and second fast moving entities. The first and second entities have first and second reflectivities, and are disposed in a fixed relationship with respect to each other. Further provided in the apparatus are a pyrometer for providing a series of temperature data related to the temperatures of the first and second entities respectively, each temperature datum having a temperature value, a reflectometer for providing a series of reflectivity data related to the first and second reflectivities, each reflectivity datum having a reflectivity value and correlated with a corresponding temperature datum so as to form a reflectivity-temperature data pair, and a computer having a memory for storing a set of computer instructions. The computer is coupled to the pyrometer and the reflectometer for receiving the series of temperature data and the series of reflectivity data and the set of computer instructions include instructions for creating a data table for storing the reflectivity-temperature data pairs according to a frequency of occurrence of each reflectivity value in the series of reflectivity data, instructions for identifying at least one reflectivity data peak representative of the first reflectivity characteristic within the data table, and instructions for determining at least the temperature of the first entity from the reflectivity data peak based upon the associated reflectivity-temperature data pairs.

In accordance with an embodiment of the present invention, the first entity is a semiconductor wafer and the second entity is a semiconductor wafer carrier, and the first reflectivity of the semiconductor wafer is higher than the second reflectivity of the semiconductor wafer carrier. Similarly, the first reflectivity of the semiconductor wafer is of a specular type and the second reflectivity of the semiconductor wafer carrier is of a diffuse type.

In accordance with another embodiment of the present invention the second entity rotates to at least 100 revolutions per minute and at least one of the series of temperature data and the series of reflectivity data are provided at a rate of at least 15 samples per second when the second entity rotates to at least 1000 revolutions per minute.

In accordance with a preferred embodiment of the present invention the set of computer instructions includes instructions for dividing a range of reflectivity values of the series of reflectivity data into a number of data bins, each data bin having a low index value and a high index value, each datum of the series of reflectivity data being assigned to one of the data bins by the computer instructions according to its reflectivity value. Further, the series of reflectivity data is a continuous series of datum points, and the set of computer instructions maintains a sliding data window including a constant number of data points from the continuous series of datum points by replacing an oldest datum point within the data window with each new datum point of the series of reflectivity data, the set of computer instructions assigning all data points within the data window to the data bins. In addition, the set of computer instructions may include a prefilter for disregarding data points within the series of reflectivity data having reflectivity values outside a given range of reflectivity values. In a further embodiment, the set of computer instructions includes a tracking filter that excludes the reflectivity-temperature data pair if the difference between the reflectivity value of a first reflectivity-temperature data pair and reflectivity values in a group of reflectivity-temperature data pair including the first reflectivity-temperature data pair exceeds a predetermined value. In a final embodiment, the set of computer instructions includes instructions for determining an alternative peak reflectivity value for the reflectivity data peak where the reflectivity peak is not easily identified.

In accordance with another embodiment of the present invention a method is provided for determining the real-time, non-contact temperature measurement of first and second fast moving entities including the steps of: providing a series of temperature data representative of a first temperature and a second temperature of the first and second entities respectively; providing a series of reflectivity data representative of a first reflectivity and a second reflectivity of the first and second entities respectively; correlating each reflectivity datum with a corresponding temperature datum so as to form reflectivity-temperature data pairs; sorting the series of reflectivity data into a data table according to a frequency of occurrence of each reflectivity datum; identifying at least one reflectivity data peak in the data table representative of the first reflectivity; and determining at least the first temperature of the first entity from the identified reflectivity data peak based upon the associated reflectivity-temperature pairs.

In accordance with another embodiment of the method of the present invention steps are provided for steps for dividing a range of reflectivity values of the series of reflectivity data into a number of data bins, each of the data bins representing a portion of the range of reflectivity values, and wherein the step of sorting the series of reflectivity data includes the step of assigning each reflectivity-temperature data pair to one of the data bins and the step of identifying at least one reflectivity data peak includes the step of selecting one of the data bins with the greatest number of reflectivity data values. Additionally, the following steps also optionally may be included: prefiltering the series of reflectivity data so as to remove data points having reflectivity values outside a given range of reflectivity values; tracking said series of temperature data and said series of reflectivity data; and excluding said reflectivity-temperature data pair if the difference between said reflectivity value of a first reflectivity-temperature data pair and the reflectivity values in a group of reflectivity-temperature data pairs including said first reflectivity-temperature data pair exceeds a predetermined value. In another embodiment of the present invention, the step of identifying at least one reflectivity data peak includes the step of determining an alternative peak value as the reflectivity data peak where the reflectivity peak is not easily identified. Finally, the method of the present invention may include the steps of windowing the series of reflectivity data so as to maintain a constant number of reflectivity data points from a continuous series of reflectivity data points for use in the steps of sorting, identifying and correlating. Finally, in a preferred embodiment of the method of the present invention, the step of identifying at least one data peak in the data table representative of the first reflectivity further includes identifying a high-valued reflectivity data peak with a greatest frequency of occurrence of reflectivity datum.

In accordance with yet another embodiment of the present invention a computer-readable medium is provided for storing a set of instructions for controlling a general purpose digital computer, the set of instructions causing the computer to provide a series of temperature data representative of a first temperature and a second temperature of the first and second entities respectively; provide a series of reflectivity data representative of a first reflectivity and a second reflectivity of the first and second entities respectively; correlate each reflectivity datum with a corresponding temperature datum so as to form reflectivity-temperature data pairs; sort the series of reflectivity data into a data table according to a frequency of occurrence of each reflectivity datum; identify at least one reflectivity data peak in the data table representative of the first reflectivity; and determine at least the first temperature of the first entity from the identified reflectivity data peak based upon the associated reflectivity-temperature pairs.

In accordance with yet another embodiment of the present invention a computer-readable medium is provided for storing a set of instructions for controlling a general purpose digital computer, the set of instructions causing the computer to divide a range of reflectivity values of said series of reflectivity data into a number of data bins, each of said data bins representing a portion of said range of reflectivity values, and wherein said instructions causing said computer to sort said series of reflectivity data include instructions causing said computer to assign each reflectivity-temperature data pair to one of said data bins and said instructions for causing said computer to identify at least one reflectivity data peak includes instructions causing said computer to select one of said data bins with the greatest number of reflectivity data values.

In accordance with yet another embodiment of the present invention, a computer-readable medium is provided for storing a set of instructions for controlling a general purpose digital computer, the set of instructions causing the computer to prefilter said series of reflectivity data so as to remove data points having reflectivity values outside a given range of reflectivity values; track said series of temperature data and said series of reflectivity data, and exclude a first reflectivity-temperature data pair if the difference between said reflectivity value of said first reflectivity-temperature data pairs and the reflectivity values in a group of reflectivity-temperature data pairs including said first reflectivity-temperature data pair exceeds a predetermined value. Further, in the instructions provided for causing said computer to identify at least one reflectivity data peak, instructions are provided to determine an alternative peak value when said reflectivity data peak is not easily identified. In addition, instructions are provided for causing said computer to window said series of reflectivity data so as to maintain a constant number of reflectivity data points from a continuous series of reflectivity data points for use in the instructions causing said computer to sort, identify and correlate. Finally, with respect to the instructions provided for causing said computer to identify at least one data peak in said data table representative of said first reflectivity, instructions are further provided for causing said computer to identify a high-valued reflectivity data peak with a greatest frequency of occurrence of reflectivity datum.

DETAILED DESCRIPTION OF THE PRESENT INVENTION

Figure 1:
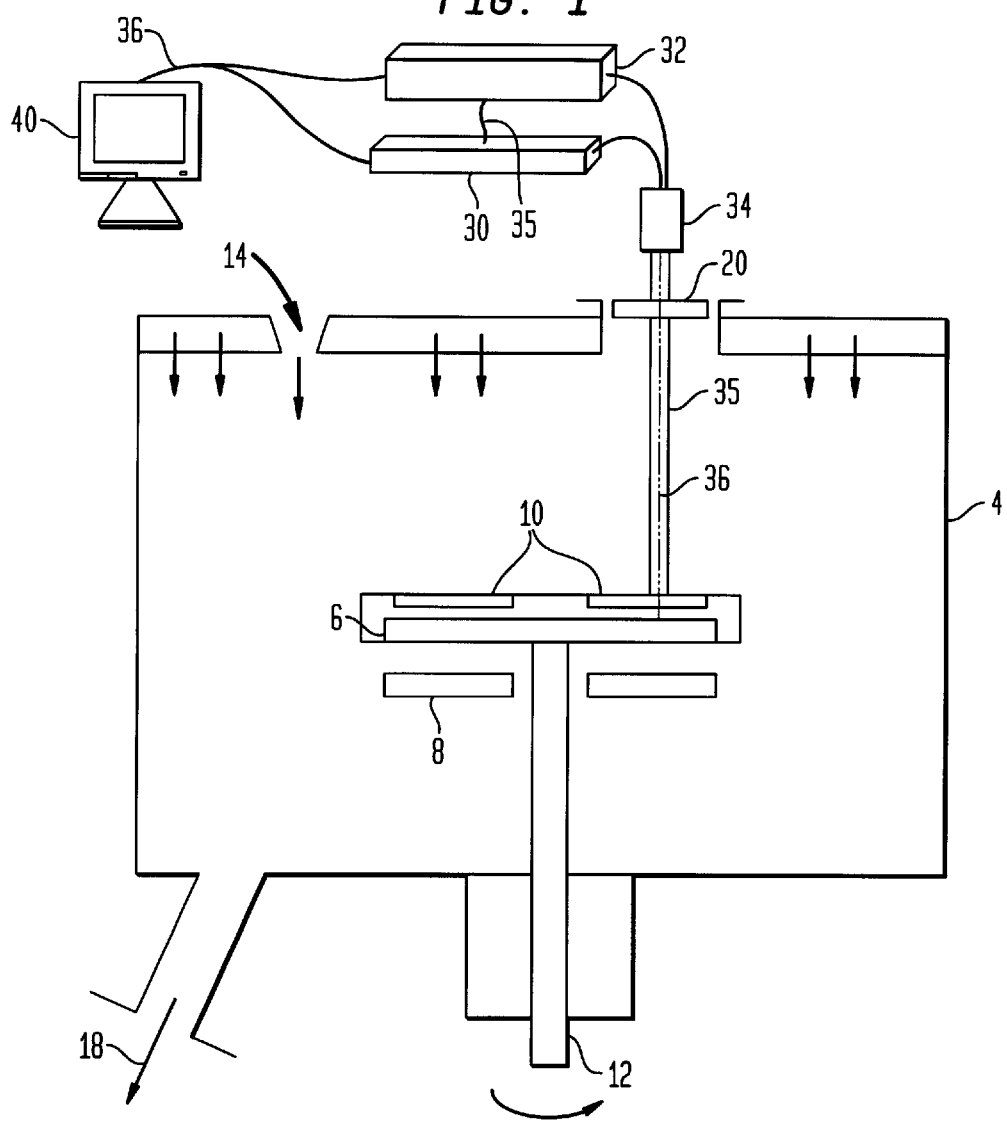
FIG. 1 is a diagram of an apparatus in accordance with the present invention.

Referring to FIG. 1, CVD chamber 4 is provided for housing a plurality of components needed to deposit injected semiconductor gasses upon wafers 10 contained within the chamber. Semiconductor wafers 10 are supported by wafer carrier 6, which is attached to rotating spindle 12. CVD gasses are introduced into chamber 4 through injector plate 14 with the exhaust from the deposition process being expelled through exhaust port 18. Rotating spindle 12 provides for rotation of the wafer carrier 6 with wafers 10 mounted thereon and is capable of rotating at fast rotational velocities, e.g well above 1000 RPM. Heating units 8 are provided beneath wafer carrier 6 for heating the wafers 10 during the CVD process. Viewport 20 is provided atop chamber 4 for optically viewing the activities occurring within the chamber.

Positioned above viewport 20 is pyrometer 30 and reflectometer 32. Pyrometer 30 and reflectometer 32 are connected to light emitting transmission head 34. Incident radiation 35 from light emitting head 34 travels along light path 36 to impinge upon spinning wafer carrier 6. In a preferred embodiment of the invention, a single device housing a combined pyrometer and reflectometer may be used in place of discrete pyrometer 30 and reflectometer 32. Such combined pyrometer/reflectometers are currently manufactured by a number of companies including CI Systems, Inc. of Agoura Hills; Calif., SVT Associates, Inc. of Eden Prairie, Minn.; Pyrometer Instrument Company, Inc. of North Vale, N.J. and Quantum Logic Corp. of Westport Conn. Pyrometer 30 and reflectometer 32 are connected via cables 36 to general purpose computer 40 so as to provide real-time data output from pyrometer 30 and reflectometer 32 to the computer. General purpose computer 40 may include any reasonably fast computing device which includes a microprocessor and memory and is capable of performing the method of the present invention by accepting real-time data provided by pyrometer 30 and reflectometer 32.

Figure 2:
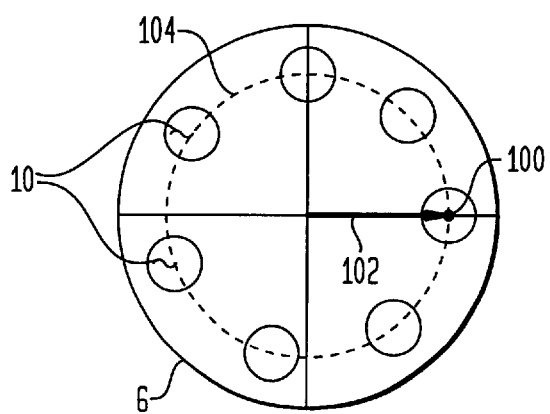
FIG. 2 is a top view of a wafer and wafer carrier according to one embodiment of the present invention.

Referring to FIG. 2., multiple semiconductor wafers 10 are positioned radially on wafer carrier 6 so as to generally maximize the number of wafers placed on the carrier. Semiconductor wafers 10 may be of any typical size (i.e. diameter), e.g., 2 inch, 4 inch, 6, inch and 12 inch. Pyrometer/reflectometer light emitting head 34 of FIG. 1 provides incident radiation 35 along light path 36 that impinges upon wafer carrier 6 and wafer 10 at measurement spot 100. As wafer carrier 6 rotates, measurement spot 100 will remain in a fixed position at radial distance 102 from the center of the rotating spindle 12 so as to provide measurement samples along circular path 104. Ideally, a significant portion of the incident radiation impinging upon a semiconductor wafer 10 having a good reflecting surface will return along light path 36 to a photodetector in pyrometer/reflectometer head 34.

Pyrometer/reflectometer measurement spot 100 is typically less than six millimeters in diameters. It is important with respect to the method of the present invention that the spot size of measurement spot 100 be smaller in diameter than the diameter of each wafer 6. Realizing that the spot is elongated into an oval-like shape during the rotation of carrier 6, this condition can be formulated as:

$$\tau < (D_w - D_p)/(2 * R * \pi * \omega) \qquad (2)$$

Where $\tau$=the parameter data acquisition time for the single measurements (in seconds), Dw=the wafer diameter (in inches),
Dp=the pyrometer spot size with no rotation (in inches),
R=radius 102 along where the measurement spot travels (in inches), and
ω=the rotational speed of the wafer carrier (in RPM).

The above condition ensures that the acquisition time for a single measurement is taken with sufficient speed so that a single measurement taken on the wafer's surface will include only information from the wafer and not the carrier. As shown in FIG. 2, the rotation of wafer carrier 6 causes incident light beam 35 to impinge upon the wafer carrier and the wafers along circular path 104, which, in turn, provides a sequence of reflected data that includes pyrometer and reflectometer measurements taken from three distinct areas: the wafer only, the carrier only, and the interface of the wafer and carrier. By ensuring that the conditions of the above equation are met, the data acquisition of the present invention will be guaranteed to include at least data related solely to the spot positioned over the wafer alone.

Pyrometer 30 calculates the target temperature in the following manner. Reflectometer 32 causes incident light beam 35 to travel along light path 36 and impinge upon the wafer carrier 6 so as to produce measurement spot 100. Assuming a smooth, highly reflective surface, i.e. specular, for wafer 10, energy incident upon the wafers will be reflected back along light path 36 and into pyrometer/reflectometer head 34. The reflectometer measures the reflected electromagnetic power of the target upon which measurement spot 100 falls and passes this information to pyrometer 30 through attachment cable 35. The pyrometer then uses this information to calculate the wafer and carrier temperature by the use of Plank's equation (1) above and using a compensated emissivity as described below.

However, the temperature of the target body may be determined only if the target body's emissivity is known. As mentioned previously and shown in FIG. 3B, the emissivity of the wafers 10 on wafer carrier 6 changes during the CVD process. As such, the reflectometer 32 uses the same reflected light energy to provide reflectivity information to pyrometer 30 so as to accurately determine the emissivity of the target body according to the following general relationship:

$$E = 1 - R \quad (3)$$

Where
E=the emissivity of the target body, and
R=the reflectivity of the target body (both measured as percentages).

Figure 3A:
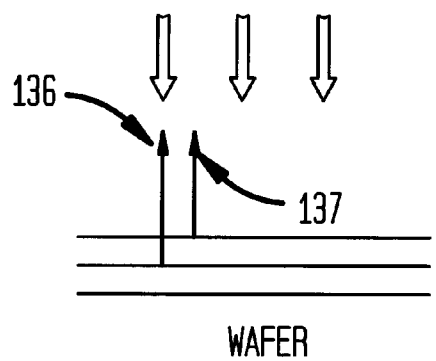
FIG. 3A is an illustration of the reflected radiation from the wafers with deposited semiconductor layers.
Figure 3B:
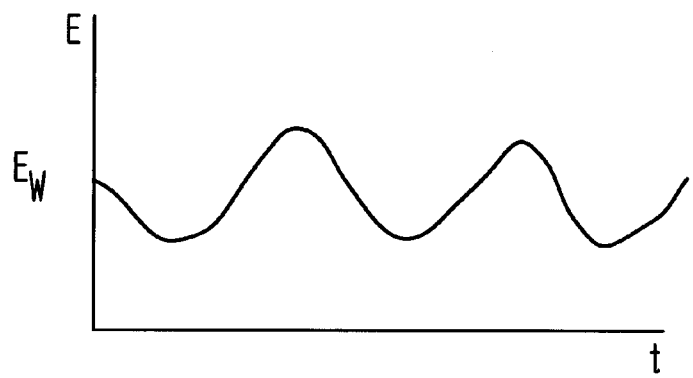
FIG. 3B is a graph of the varying emissivity of the wafer during processing.
Figure 3C:
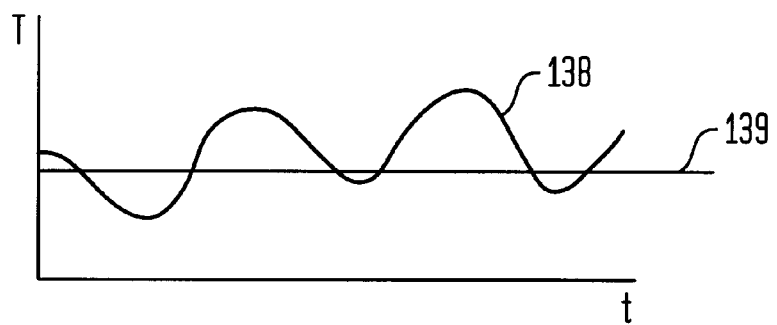
FIG. 3C is a graph of the apparent varying, wafer temperature using the emissivity of FIG. 3A.

More specifically, the emissivity of both the wafer carrier and the wafers are generally constant before deposition begins. Wafer carrier 6 provides a rough, relatively non-reflective surface, i.e. diffuse, during the deposition process. As such, the reflectometer 32 records a relativity low reflectivity (high emissivity by equation (3) above) when measurement spot 100 impinges upon it. Further, the reflectivity of the wafer carrier 6 does not significantly change during the course of the deposition process. On the other hand, prior to deposition, wafer 10 provides a specular surface which reflects a large quantity of the incident radiation. As different layers of the deposited materials are accumulated on wafers 10, different portions of the incident light from the reflectometer are transmitted to different layers as shown in FIG. 3A. At certain points in the deposition process, therefore, reflected light components 136 and 137 reflected from the different wafer layers destructively interfere with one another resulting in a lower detected reflectivity. As shown in FIG. 3B, the wafer emissivity, Ew, determined by the pyrometer will change during the course of the CVD process. As described above, this reflectivity, or emissivity, data calculated according to equation (3) above, is fed to pyrometer 30 for use in calculating the target body temperature, which, without emissivity compensation, results in the variable temperature profile 138 as shown in FIG. 3C. Thus, as the emissivity of the semiconductor wafers 10 changes over the course of the deposition process, the apparent detected temperature of the wafers by pyrometer 30 will also change, although the actual temperature may be constant.

To correct for this variation in temperature measurements based on the variation in wafer emissivity, reflectivity data is collected by reflectometer 32 and is further used by the pyrometer 30 to provide a compensated emissivity. This compensated emissivity is then used by pyrometer 30 to calculate a more accurate target body temperature as shown as temperature profile 139 in FIG. 3C. Once the instantaneous emissivity of the target is known, the temperature of the target may be calculated according to Plank's equation. Thus, the combined pyrometers/reflectometers listed above are designed to coordinate the measurements from the two devices to determine a true emissivity and calculate the actual temperature of the target body. These devices also typically contain a data storage area for holding a sequence of readings and a data port for connection to links 36 and computer 40.

According to the present invention, the collection of reflectivity data further serves to distinguish the physical location of each individual reading in the following manner. Since the reflectivity of the wafer carrier 6 will always be different than that of the wafers 10, regardless of the instantaneous wafer reflectivity, this reflectivity data may be used to distinguish whether the associated temperature datum was taken on either the wafer carrier, the semiconductor wafer surface, or at the interface of the two. As each pair of reflectivity and temperature readings is generated by reflectometer 32 and pyrometer 30, the data pairs are transmitted along links 36 to computer 40 for processing.

Software modules designed specifically to practice the temperature determination method of the present invention are stored in the operating memory of general purpose computer 40. People of skill in the art will recognize that any available computer programming language and database software may be used to implement the present invention, although Visual Basic running on a Windows 95 platform was used to create the first version of this program. Further, those skilled in the art will realize that equivalently functioning charts, tables routines and procedures may be employed to achieve the objects of the invention listed below. Finally, the following discussion assumes that reflectivity values are used along with temperature values to practice the following invention, although persons of skill in the art will realize that emissivity values may equivalently be used in appropriate places by relationship (3) above.

Figures 4A, 4B:
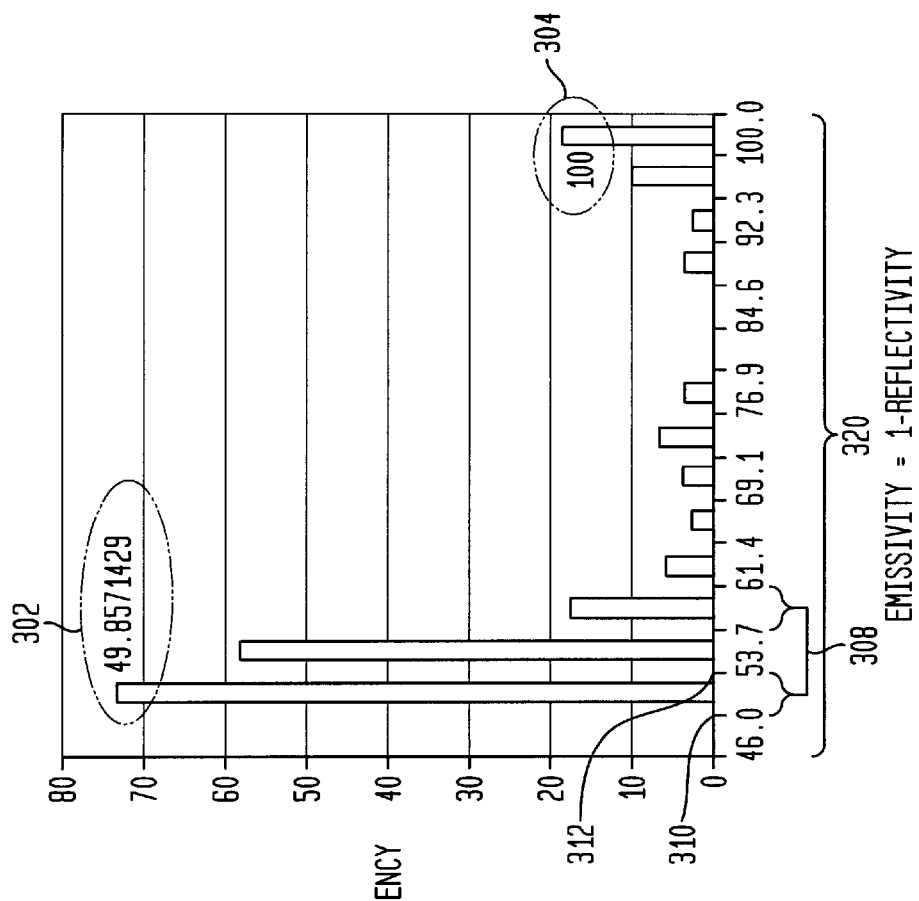
FIG. 4A is a chart containing the emissivity (or reflectivity) and temperature data taken according to one embodiment of the present invention.
FIG. 4B is a histogram created from the chart of FIG. 4A according to one embodiment of the present invention.

First, as shown in FIG. 4A, a data table is created by the software for storing reflectivity-temperature data pairs, each data pair consisting of a reflectivity value and a temperature value. These data are transmitted along links 36 as they are collected and output by pyrometer 30 and reflectometer 32. Once a sufficient number of data pairs have been collected, the software creates a histogram, showing the frequency of the reflectivity values as shown in FIG. 4B. From this histogram, two identifiable reflectivity peaks labeled 302 and 304 are identified by the software according to their relative frequency of occurrence with respect to the other reflectivity values. Once these peaks are identified, the computer software then uses those peak reflectivity values to isolate and distinguish those readings taken on the wafer carrier from those taken on the wafer. The table in FIG. 4A is then consulted to determine the wafer temperature(s) corresponding to those reflectivity values. By differentiating the data pair based on reflectivity frequency, the method of the invention provides an accurate reading of the temperatures of the wafers 10 as distinguished from the temperature readings taken on either the wafer carrier 6 or those readings taken at the interface or boundary between the wafer and wafer carriers.

Figure 5:
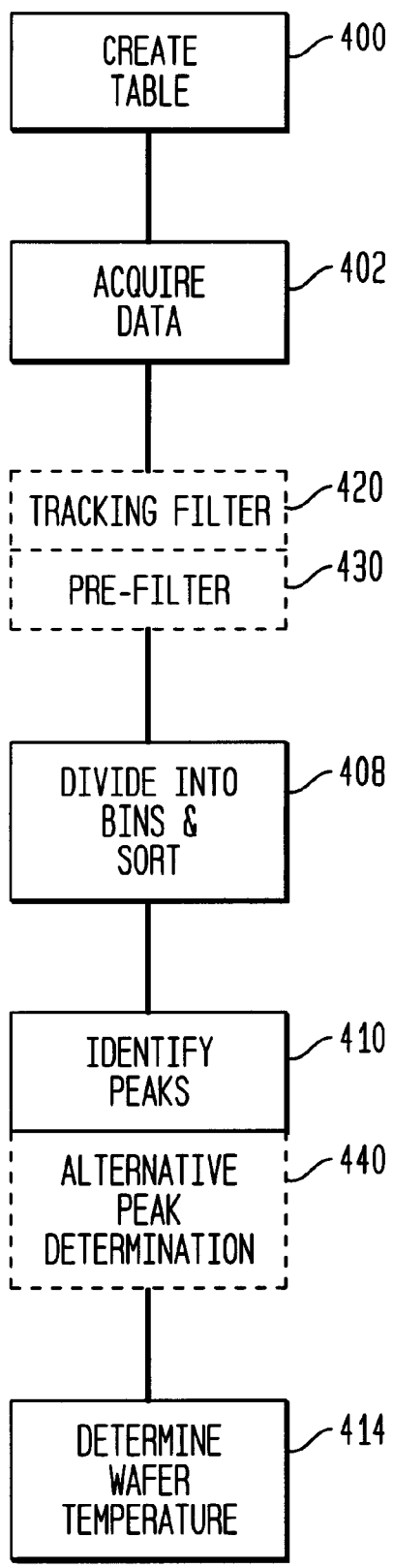
FIG. 5 is one embodiment of the process flow of the method of the present invention.

The software operating on general purpose computer 40 may consist of a number of software modules, which perform the various, above-described functions. A functional flow chart of an exemplary embodiment is shown in FIG. 5. Each of the operative steps within each block of FIG. 5 is performed by one or more software modules or routines. In particular, the software of the present invention creates a table at step 400 of reflectivity-temperature data pairs, as received from pyrometer 30 and reflectometer 32 during each sampling period. After creating the table, the software is responsible for continuously importing reflectivity-temperature data pairs from new readings into the table shown in FIG. 4A.

After a threshold number of data pairs are acquired and imported into the table, the software divides the range of collected reflectivity values into a number of bins. This is shown as step 408 of FIG. 5. Each of the bins, 308 in FIG. 4B, is defined by a high reflectivity value 310 and a low reflectivity value 312, and each such defined bin is of approximate equal range in represented reflectivity. The sum of the reflectivity ranges of bins 308 comprise the entire range of reflectivity values 320 collected in step 402. As each of the reflectivity-temperature data pairs are collected and input into the table of FIG. 4A, the reflectivity values are sorted so as to associate each reflectivity-temperature data pair with a particular bin. Once a threshold number of data pairs have been accumulated, the software identifies at least one reflectivity peak, 410 of FIG. 5, which is typically the bin containing the greatest number of reflectivity-temperature data pairs. After such identification, the software then references the reflectivity-temperature data table of FIG. 4A to determine the temperature values, 414 of FIG. 5, corresponding to the reflectivity values which have been identified as being attributable to the identified peak.

Figure 6:
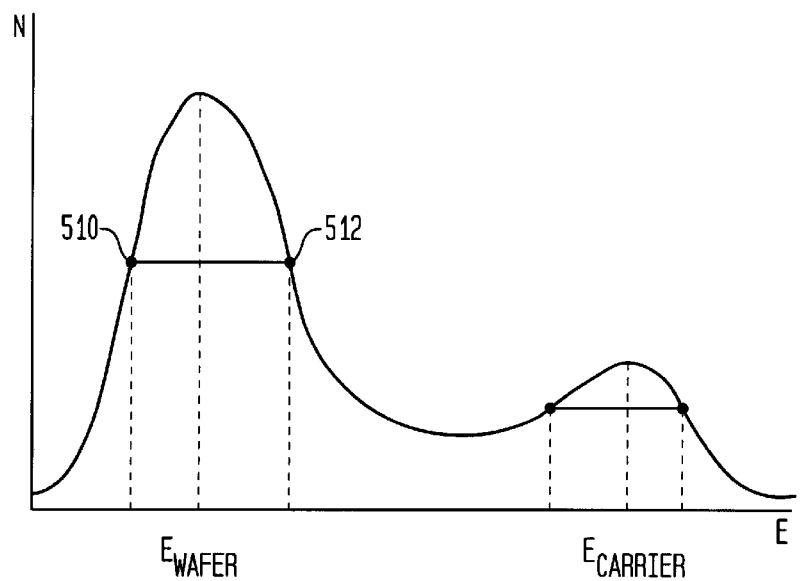
FIG. 6 is an exemplary histogram of emissivities.

In referring to FIG. 5, the software's selection of the appropriate number of bins to create in step 408, including the approximately equal reflectivity ranges given to each of the bins, 308 in FIG. 4, is dependent upon the overall range of reflectivity values collected during the data acquisition stage 402. In particular, the narrower the width of the histogram peaks, as defined by 510 and 512 of FIG. 6, the fewer the number of bins needed to appropriately separate the detected peak(s). Alternatively, the wider the data peaks in the histograms of FIG. 4B and as shown in FIG. 6, the larger the number of bins that will be needed to appropriately categorize the incoming reflectivity-temperature data pairs so that an appropriate reflectivity data peak can be determined in step 410 of FIG. 5. A wide-peaked histogram may result, for example, from the use of a larger variety of deposited materials on the semiconductor substrate thereby giving a more disbursed range of reflectivity values detected by the reflectometer. Further, different wafer-to-carrier surface area ratios and wafer wobble during the wafer spinning may also cause variations in the histogram peak widths.

Data acquisition according to step 402 of FIG. 5 occurs at a rate of about 40 samples per second at any rotational velocity of the wafer carrier 6. This sampling rate may be increased or decreased appropriately to reduce the amount of noise tolerated by the system.

Figure 7:
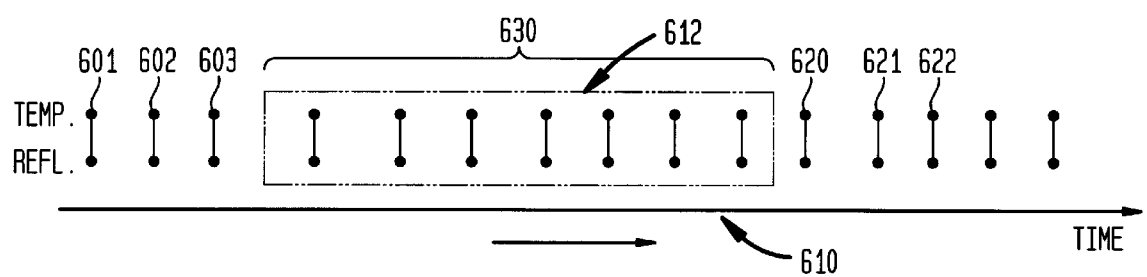
FIG. 7 is a diagram of a sliding data window according to one embodiment of the present invention.

Further, a sliding data window may also be used with the method of the present invention. As shown in FIG. 7, data points 601, 602, 603, are sequentially acquired by the software of the present invention along timeline 610. Sliding data window 612 blocks out a period of time including a specific, fixed number of reflectivity-temperature data pairs for inclusion in the table shown in FIG. 4A. As additional samples are acquired, 620, 621, 622 for example, data window 612 slides along the acquisition timeline 610 so as to contain only the fixed number of samples upon which to base the determination of the semiconductor wafer carrier temperature. The reflectivity-temperature data pairs acquired in the manner shown in FIG. 7 are used in an identical fashion with respect to the steps shown in FIG. 5. The use of a sliding data window as shown in FIG. 7 permits only the most recent data acquired by the system of the present invention to be used to correctly determine the semiconductor wafer temperature while disregarding older, less relevant data. The width 630 of the sliding data window 612, and consequently the number of reflectivity-temperature data pairs to be included within the reflectivity temperature table, depends upon the accuracy needed for the temperature determination, the storage and processing capabilities of the general purpose computer and the strength of the negative-feedback control loop which regulates the temperature of the semiconductor wafers. In general, data should be provided as fast as possible so as to provide the tightest feedback loop.

Also included as an option in the software of the present invention, is a tracking filter that provides for the rejection of statistically deviant data. In particular, if the reflectivity-temperature data pairs being collected have reflectivity values within a given range, e.g., as defined by 320 of FIG. 4B, any reflectivity-temperature data value significantly outside the bounds of this range may be rejected by the software before inclusion in the data table in that the data may be considered statistically deviant and not capable of contributing in a positive fashion to the accurate determination for the semiconductor wafer temperature. In particular, the tracking filter may be used to disregard any reflectivity-temperature data pairs in which the difference between sequential reflectivity values exceeds a predetermined maximum value. The above-described tracking filter is shown as optional step 420 in FIG. 5.

In addition to the above-mentioned tracking filter, a prefilter may also be used to discard received reflectivity-temperature data pairs in which the reflectivity values are outside a given range of reflectivity values. Such a prefilter typically operates after the computer's acquisition of data, step 402 in FIG. 5, and before the data is divided into bins and sorted in step 408. For example, it may be determined that everything below a particular reflectivity value represents the wafer carrier and therefore may be rejected since it is not relevant to the determination of the semiconductor wafer temperature. As such, all data below that reflectivity value threshold can be programmed to be rejected so as to make the number of data points within the data table smaller and to allow for an easier identification of a single peak in step 410 in FIG. 5. The prefilter step is shown as optional step 430 in FIG. 5.

A maximum alternative peak algorithm may also be programmed as part of the software of the present invention. This algorithm relies on the fact that the reflectivity of the wafers will be reasonably high with respect to the reflectivity of any other portions of the wafer carrier or combination of the wafer carrier and semiconductor wafers. As such, all data having reflectivity lower than a certain threshold, for example 2%, must be determined to be the wafer carrier regardless of the number of data pairs in any one bin in that region of reflectivity values. The alternative maximum algorithm recognizes that whatever error is present in the data, the reflectivity of the data is the best measure of such data and that a single peak indicative of the reflectivity of the semiconductor wafers can be identified as being in a bin containing data closest to the high reflectivity end of the histogram. This alternative algorithm can be combined with the prefilter or tracking routines listed above, although the alternative maximum peak algorithm typically operates during the identification of reflectivity peaks, shown as optional step 440 in FIG. 5.

While particular embodiments and applications of the invention have been shown and described, it will be obvious to those skilled in the art that the specific terms and figures are employed in a generic and descriptive sense only and not for the purposes of limiting or reducing the scope of the broader inventive aspects herein. By disclosing the preferred embodiments of the present invention above, it is not intended to limit or reduce the scope of coverage for the general applicability of the present invention. Persons of skill in the art will easily recognize the substitution of similar components and steps in the apparatus and methods of the present invention.

What is claimed is:

1. A device for determining the real-time, non-contact temperature measurement of first and second moving entities having first and second reflectivities and disposed in a fixed relationship with respect to each other comprising:
    a pyrometer for providing a series of temperature data related to the temperatures of said first and second entities respectively, each temperature datum having a temperature value;
    a reflectometer for providing a series of reflectivity data related to said first and second reflectivities, each reflectivity datum having a reflectivity value and correlated with a corresponding temperature datum so as to form a reflectivity-temperature data pair; and
    a computer having a memory for storing a set of computer instructions, said computer coupled to said pyrometer and said reflectometer for receiving said series of temperature data and said series of reflectivity data, said set of computer instructions including instructions for creating a data table for storing said reflectivity-temperature data pairs according to a frequency of occurrence of each reflectivity value in said series of reflectivity data, instructions for identifying at least one reflectivity data peak representative of said first reflectivity within said data table, and instructions for determining at least said temperature of said first entity from said reflectivity data peak based upon said reflectivity-temperature data pairs associated with said peak.

2. The device of claim 1 wherein said first entity is a semiconductor wafer and said second entity is a semiconductor wafer carrier.

3. The device of claim 2 wherein said first reflectivity of said semiconductor wafer is higher than said second reflectivity of said semiconductor wafer carrier.

4. The device of claim 2 wherein said first reflectivity of said semiconductor wafer is of a specular type and said second reflectivity of said semiconductor wafer carrier is of a diffuse type.

5. The device of claim 2 wherein said second entity rotates to at least 100 revolutions per minute.

6. The device of claim 1 wherein at least one of said series of temperature data and said series of reflectivity data is provided at a rate of at least 15 samples per second when said second entity rotates to at least 1000 revolutions per minute.

7. The device of claim 1 wherein said set of computer instructions further includes instructions for dividing a range of reflectivity values of said series of reflectivity data into a number of data bins, each data bin having a low index value and a high index value, each datum of said series of reflectivity data being assigned to one of said data bins by said computer instructions according to its reflectivity value.

8. The device of claim 7 wherein said series of reflectivity data is a continuous series of datum points, and said set of computer instructions maintains a sliding data window including a constant number of data points from said continuous series of datum points by replacing an oldest datum point within said data window with each new datum point of said series of reflectivity data, said set of computer instructions assigning data points within said data window to said data bins.

9. The device of claim 1 wherein said set of computer instructions includes a prefilter for disregarding data points within said series of reflectivity data having reflectivity values outside a given range of reflectivity values.

10. The device of claim 1 wherein said set of computer instructions includes a tracking filter that excludes one of said reflectivity-temperature data pairs if the difference between the reflectivity value of said one reflectivity-temperature data pair and the reflectivity values of a group of reflectivity-temperature data pairs exceeds a predetermined value.

11. The device of claim 1 wherein said set of computer instructions includes instructions for determining an alternative peak reflectivity value for said reflectivity data peak.

12. A method of determining the real-time, non-contact temperature measurement of first and second moving entities comprising:
    providing a series of temperature data representative of a first temperature and a second temperature of said first and second entities respectively;
    providing a series of reflectivity data representative of a first reflectivity and a second reflectivity of said first and second entities respectively;
    correlating each reflectivity datum with a corresponding temperature datum so as to form reflectivity-temperature data pairs;
    sorting said series of reflectivity data into a data table according to a frequency of occurrence of each reflectivity datum;
    identifying at least one reflectivity data peak in said data table representative of said first reflectivity; and
    determining at least said first temperature of said first entity from said identified reflectivity data peak based upon said associated reflectivity-temperature data pairs.

13. The method of claim 12 further comprising dividing a range of reflectivity values of said series of reflectivity data into a number of data bins, each of said data bins representing a portion of said range of reflectivity values, and wherein said step of sorting said series of reflectivity data includes the step of assigning each reflectivity-temperature data pair to one of said data bins and said step of identifying at least one reflectivity data peak includes the step of selecting one of said data bins with the greatest number of reflectivity data values.

14. The method of claim 12 further comprising prefiltering said series of reflectivity data so as to remove data points having reflectivity values outside a given range of reflectivity values.

15. The method of claim 12 further comprising tracking said series of temperature data and said series of reflectivity data, and excluding one of said reflectivity-temperature data pairs if the difference between the reflectivity value of said one reflectivity-temperature data pair and the reflectivity values of a group of reflectivity-temperature data pairs exceeds a predetermined value.

16. The method of claim 12 wherein said step of identifying at least one reflectivity data peak includes the step of determining an alternative peak value as said reflectivity data peak.

17. The method of claim 12 further comprising windowing said series of reflectivity data so as to maintain a constant number of reflectivity data points from a continuous series of reflectivity data points for use in the steps of sorting, identifying and determining.

18. The method of claim 12 wherein said step of identifying at least one data peak in said data table representative of said first reflectivity further includes identifying a data peak with a high reflectivity and a greatest frequency of occurrence of reflectivity data.

19. A computer-readable medium for storing a set of instructions for controlling a general purpose digital computer, said set of instructions causing said computer to determine the temperature of first and second moving entities, said instructions including instructions to cause said computer to:

receive a series of temperature data representative of a first temperature and a second temperature of said first and second entities respectively;

receive a series of reflectivity data representative of a first reflectivity and a second reflectivity of said first and second entities respectively;

correlate each reflectivity datum with a corresponding temperature datum so as to form reflectivity-temperature data pairs;

sort said series of reflectivity data into a data table according to a frequency of occurrence of each reflectivity datum;

identify at least one reflectivity data peak in said data table representative of said first reflectivity; and determine at least said first temperature of said first entity from said identified reflectivity data peak based upon said associated reflectivity-temperature data pairs.

20. The computer-readable medium of claim 19, said set of instructions further causing said computer to divide a range of reflectivity values of said series of reflectivity data into a number of data bins, each of said data bins representing a portion of said range of reflectivity values, and wherein said instructions for causing said computer to sort said series of reflectivity data include instructions for causing said computer to assign each reflectivity-temperature data pair to one of said data bins and said instructions for causing said computer to identify at least one reflectivity data peak include instructions for causing said computer to select one of said data bins with the greatest number of reflectivity data values.

21. The computer-readable medium of claim 19, said set of instructions further causing said computer to prefilter said series of reflectivity data so as to remove data points having reflectivity values outside a given range of reflectivity values.

22. The computer-readable medium of claim 19, said set of instructions further causing said computer to track said series of temperature data and said series of reflectivity data, and exclude one of said reflectivity-temperature data pairs if the difference between the reflectivity value of said one reflectivity-temperature data pair and the reflectivity values of a group of reflectivity-temperature data pairs exceeds a predetermined value.

23. The computer-readable medium of claim 19, wherein said instructions causing said computer to identify at least one reflectivity data peak include instructions for causing said computer to determine an alternative peak value as said reflectivity data peak.

24. The computer-readable medium of claim 19, said set of instructions further causing said computer to window said series of reflectivity data so as to maintain a constant number of reflectivity data points from a continuous series of reflectivity data points for use in the instructions causing said computer to sort, identify and determine.

25. The computer-readable medium of claim 19, wherein said instructions causing said computer to identify at least one data peak in said data table representative of said first reflectivity further include instructions causing said computer to identify a data peak with a high reflectivity and a greatest frequency of occurrence of reflectivity data.

26. A method for determining a first temperature corresponding to a first moving body, said first moving body having a first reflectivity and a positional relationship to a second moving body, said second moving body having a second temperature and a second reflectivity, said method comprising:

providing a series of temperature data representative of said first temperature and said second temperature;

providing a series of reflectivity data representative of said first reflectivity and said second reflectivity;

correlating each temperature datum of said series of temperature data with a reflectivity datum of said series of reflectivity data;

sorting said series of reflectivity data into a plurality of groups, each of said groups corresponding to a reflectivity range;

determining the relative sizes of said groups;

based upon said relative sizes, identifying at least one of said groups having reflectivity data corresponding to said first reflectivity;

determining said first temperature based upon the temperature data correlated with the reflectivity data within said one group.

27. The method of claim 26, further comprising providing said series of temperature data at a fixed rate, and providing said series of reflectivity data at a fixed rate.

28. The method of claim 26, further comprising determining the relative sizes of said groups based upon the reflectivity data provided within a predetermined time period.

29. The method of claim 26, wherein said series of temperature data is provided by a pyrometer and said series of reflectivity data is provided by a reflectometer.

30. The method of claim 26, further comprising providing said series of temperature data and said series of reflectivity data to a computer, and wherein said steps of sorting said series, determining said relative sizes, identifying at least one of said groups and determining said first temperature are performed by said computer.

31. The method of claim 26, further comprising eliminating from said series of reflectivity data each reflectivity datum having a value less than a predetermined value.

32. The method of claim 26, wherein said identifying at least one of said groups comprises identifying the group having the largest amount of reflectivity data.

33. The method of claim 26, wherein said first moving body is a semiconductor wafer and said second moving body is a semiconductor wafer carrier.

34. The method of claim 26, wherein said positional relationship is a fixed relationship.

35. A system for determining a first temperature corresponding to a first moving body, said first moving body having a first reflectivity and a positional relationship to a second moving body, said second moving body having a second temperature and a second reflectivity, said system comprising:

means for providing a series of temperature data representative of said first temperature and said second temperature;

means for providing a series of reflectivity data representative of said first reflectivity and said second reflectivity;

means for correlating each temperature datum of said series of temperature data with a reflectivity datum of said series of reflectivity data;

means for sorting said series of reflectivity data into a plurality of groups, each of said groups corresponding to a reflectivity range;

means for determining the relative sizes of said groups;

means, based upon said relative sizes, for identifying at least one of said groups having reflectivity data corresponding to said first reflectivity;

means for determining said first temperature based upon the temperature data correlated with the reflectivity data within said one group.

36. The system of claim 35, further comprising means for providing said series of temperature data at a fixed rate, and means for providing said series of reflectivity data at a fixed rate.

37. The system of claim 35, further comprising means for determining the relative sizes of said groups based upon the reflectivity data provided within a predetermined time period.

38. The system of claim 35, wherein said means for providing said series of temperature data comprises a pyrometer and said means for providing said series of reflectivity data comprises a reflectometer.

39. The system of claim 35, further comprising means for providing said series of temperature data and said series of reflectivity data to a computer, and wherein said means for sorting said series, determining said relative sizes, identifying at least one of said groups and determining said first temperature comprises said computer.

40. The system of claim 35, further comprising means for eliminating from said series of reflectivity data each reflectivity datum having a value less than a predetermined value.

41. The system of claim 35, wherein said means for identifying at least one of said groups comprises means for identifying the group having the largest amount of reflectivity data.

42. The system of claim 35, wherein said first moving body is a semiconductor wafer and said second moving body is a semiconductor wafer carrier.

43. The system of claim 35, wherein said positional relationship is a fixed relationship.

44. A computer-readable medium for storing computer-executable software code to cause a computer to determine a first temperature corresponding to a first moving body, said first moving body having a first reflectivity and a positional relationship to a second moving body, said second moving body having a second temperature and a second reflectivity, said software code comprising code for causing said computer to:

receive a series of temperature data representative of said first temperature and said second temperature;

receive a series of reflectivity data representative of said first reflectivity and said second reflectivity;

correlate each temperature datum of said series of temperature data with a reflectivity datum of said series of reflectivity data;

sort said series of reflectivity data into a plurality of groups, each of said groups corresponding to a reflectivity range;

determine the relative sizes of said groups;

based upon said relative sizes, identify at least one of said groups having reflectivity data corresponding to said first reflectivity;

determine said first temperature based upon the temperature data correlated with the reflectivity data within said one group.

45. The computer-readable medium of claim 44, wherein said series of temperature data is received at a fixed rate, and said series of reflectivity data is received at a fixed rate.

46. The computer-readable medium of claim 44, wherein said software code further comprises code for causing said computer to determine the relative sizes of said groups based upon the reflectivity data provided within a predetermined time period.

47. The computer-readable medium of claim 44, wherein said series of temperature data is received from a pyrometer and said series of reflectivity data is received from a reflectometer.

48. The computer-readable medium of claim 44, wherein said software code further comprises code for causing said computer to eliminate from said series of reflectivity data each reflectivity datum having a value less than a predetermined value.

49. The computer-readable medium of claim 44, wherein said software code for causing said computer to identify at least one of said groups comprises code for causing and said computer to identify the group having the largest amount of reflectivity data.

50. The computer-readable medium of claim 44, wherein said first moving party is a semiconductor wafer and said second moving body is a semiconductor wafer carrier.

51. The computer-readable medium of claim 44, wherein said positional relationship is a fixed relationship.

* * * * *

UNITED STATES PATENT AND TRADEMARK OFFICE
CERTIFICATE OF CORRECTION

PATENT NO.    : 6,349,270 B1  
DATED         : February 19, 2002  
INVENTOR(S)   : Alexander Gurary, Vadim Boguslavskiy, Ameesh N. Patel and Jeffrey C. Ramer It is certified that error appears in the above-identified patent and that said Letters Patent is hereby corrected as shown below:

Title page,
Item [74], under *Attorney, Agent, or Firm*, "Kromholz" should read -- Krumholz --.
Item [57], ABSTRACT,
Line 3, "is" should read -- are --.

Column 1,
Line 61, cancel the second occurrence of the word "time" after the word "time."

Column 2,
Line 19, the word "modem" should read -- modern --.

Column 4,
Line 16, cancel the words "for steps" after the word "provided."

Column 8,
Line 61, the word "have" should read -- has --.

Column 10,
Line 33, cancel the comma after the word "invention."

Column 16,
Line 50, cancel the word "and" after the word "causing."

Signed and Sealed this

Twentieth Day of August, 2002

*Attest:*

JAMES E. ROGAN
*Attesting Officer*    *Director of the United States Patent and Trademark Office*